United States Patent [19]
Morrison

[11] Patent Number: 5,596,877
[45] Date of Patent: Jan. 28, 1997

[54] HEADER AND COIL ARRANGEMENT FOR COOLING APPARATUS

[75] Inventor: Frank T. Morrison, Arnold, Md.

[73] Assignee: Baltimore Aircoil Company, Inc., Jessup, Md.

[21] Appl. No.: 515,596

[22] Filed: Aug. 16, 1995

[51] Int. Cl.⁶ .................................................. F25D 17/02
[52] U.S. Cl. ................................ 62/59; 62/434; 62/513; 62/525; 165/10; 165/176
[58] Field of Search ............................... 62/59, 434, 513, 62/525; 165/10, 176

[56] References Cited

U.S. PATENT DOCUMENTS

| | | | |
|---|---|---|---|
| 2,538,015 | 1/1951 | Kleist | 62/525 |
| 4,414,821 | 11/1983 | Jing | 62/513 X |
| 4,520,867 | 6/1985 | Sacca et al. | 165/176 X |
| 4,831,831 | 5/1989 | Carter et al. | 62/59 |

*Primary Examiner*—Christopher Kilner
*Attorney, Agent, or Firm*—Edward J. Brosius; F. S. Gregorczyk; Stephen J. Manich

[57] ABSTRACT

A cooling apparatus is provided comprising a vessel confining a pool of liquid. A plurality of separate tubular passageways are immersed in the liquid. A header assembly is provided having a first chamber and a second chamber. The first chamber is operatively connected to one end of each of the separate tubular passageways and the second chamber is operatively connected to the other end of each of the separate tubular passageways.

15 Claims, 5 Drawing Sheets

HEADER AND COIL ARRANGEMENT FOR COOLING APPARATUS

BACKGROUND OF THE INVENTION

This invention relates to thermal storage and fluid cooling and, more particularly, to an improved method and apparatus for forming, storing, and utilizing ice on a plurality of tubular passageways passing throughout a pool of fluid stored in a vessel. Alternately, an improved method and apparatus are provided for cooling a fluid passing through the plurality of tubular passageways throughout a pool of fluid in a vessel.

Ice storage equipment which forms ice during off-peak energy periods and then melts ice to supplement as a supply of cold to further cool a working liquid is known, for example, from U.S. Pat. No. 4,831,831. One known form of such ice storage equipment utilizes a refrigerant liquid flowing through a plurality of parallel tubular passageways which themselves are submerged in a pool of freezable storage liquid such as water. The plurality of refrigerant channels are usually connected between inlet and outlet headers which receive and discharge the refrigerant liquid.

During the ice production cycle, the refrigerant liquid, usually an ethylene or propylene glycol solution, is provided from a mechanical refrigeration unit to the inlet header and then through the plurality of tubular passageways. Such flow of sub-freezing refrigerant acts to form ice from the pool of liquid, which is usually water, about the individual passageways. During the supplemental cooling cycle, the refrigerant liquid is circulated through the plurality of tubular passageways after the refrigerant has been warmed usually by passing through a heat exchanger in an air conditioning or cooling system. Such a refrigerant is in turn sub-cooled by passing through the ice surrounded passageways. The refrigerant in turn melts the ice surrounding the passageways.

The present invention also applies to fluid cooling arrangements, wherein fluid to be cooled passes through a plurality of tubular passageways immersed in a pool of liquid within a vessel. The pool of liquid itself is cooled, usually by the use of a cooling tower. In turn, the liquid passing through the plurality of tubular passageways is cooled by the indirect contact with the pool of cooled liquid. The arrangement of the plurality of tubular passageways in the fluid cooling arrangement is quite similar to the ice storage arrangement, except that it is usually desirable to have counter-current flow in the ice storage arrangement whereby uniform ice build-up is produced on the outside of the tubular passageways. In a fluid cooling arrangement, it is usually desirable to have completely parallel flow through the adjacent tubular passageways.

It is desirable to improve the efficiency of the coil arrangement and tubular passageways or coil arrangement in the pool of liquid by eliminating unnecessary header and inlet piping or manifold space and replacing such space with tubular passageways that contribute to the cooling capacity of the system.

SUMMARY OF THE INVENTION

Accordingly, it is an object of the present invention to provide an improved method and apparatus for an ice storage or fluid cooling arrangement utilizing a plurality of passageways immersed in a pool of liquid.

It is another object of the present invention to provide a more efficient header and manifold arrangement for an ice thermal storage or fluid cooling apparatus having a plurality of passageways immersed in a pool of liquid.

The present invention provides an improved ice storage/supplemental cooling or fluid cooling method and apparatus having an improved header and manifold arrangement. A single elongated header is provided which header has an inner and outer compartment. The inner compartment is operatively connected to one end of each of a plurality of tubular passageways. The outer compartment is operatively connected to the other end of each of a plurality of tubular passageways. An inlet manifold is connected to one of the inner or outer compartments of the header to supply refrigerant liquid to the plurality of passageways. An outlet manifold is connected to the other inner or outer compartment to receive the liquid refrigerant that has passed through the plurality of tubular passageways.

The header itself can be arranged in various configurations, but the common feature of all such arrangements is that one end of each of the plurality of tubular passageways is connected to one compartment or section of the header, and the other end of each of the plurality of tubular passageways is connected to the other compartment or section of the header. Accordingly, liquid refrigerant that is introduced to the one compartment will flow through all of the tubular passageways and into the other compartment or section of the header.

The improved header, tubular passageway, and liquid containing vessel of the present invention can be utilized as either an ice storage arrangement to provide supplemental cooling to a liquid passing through the tubular passageways or can be used as a fluid cooler wherein the storage liquid in the vessel itself in which the tubular passageways are immersed provides the cooling to the fluid passing through the plurality of tubular passageways.

BRIEF DESCRIPTIONS OF THE DRAWINGS

Referring to the drawings.

DETAILED DESCRIPTION OF THE INVENTION

Figure 1:
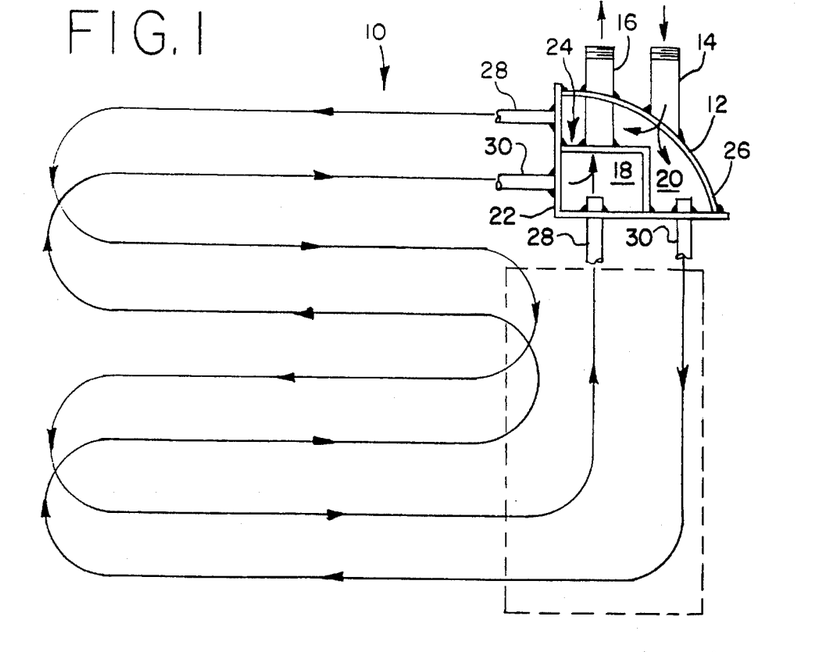
FIG. 1 is a side view in partial cross-section of a cooling apparatus in accordance with the present invention.
Figures 3, 5, 6:
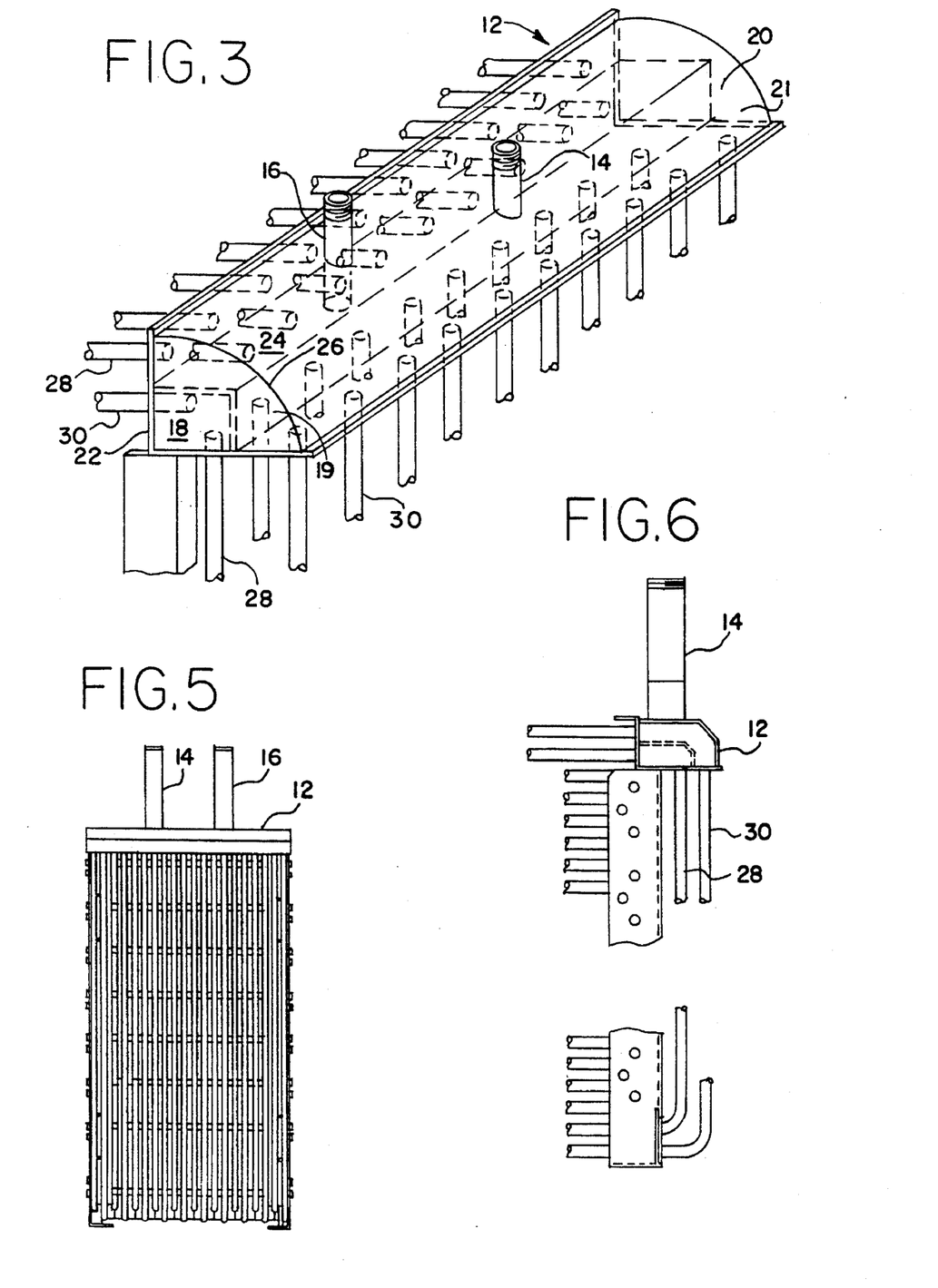
FIG. 3 is a perspective view of a cooling apparatus in accordance with the present invention.
FIG. 5 is an end view of a cooling apparatus in accordance with the present invention.
FIG. 6 is a detailed side view of the header and manifold connections of a cooling apparatus in accordance with the present invention.

Referring to FIGS. 1 and 3 of the drawings, a cooling apparatus in accordance with the present invention is shown generally at 10. It should be understood that cooling apparatus 10 itself is immersed in a pool of liquid held within a vessel, but this view is shown in later drawings.

Cooling apparatus 10 includes header 12 which is seen as an elongated structure extending laterally across the top of cooling apparatus 10 at one end thereof. Header 10 is usually comprised of galvanized steel, but can be comprised of stainless steel or other suitable materials such as plastic. Header 12 can take various configurations, several of which are shown in later drawings and will be later described. However, in general, header 12 comprises an inner compartment 18 and an outer compartment 20. These two compartments are sealed from each other such that liquid in the inner compartment cannot interact with or flow into outer compartment 20 and vice versa. In one preferred embodiment of header 12, a base section 22 is provided as a plate section bent at a 90° angle. Base section 22 forms an outer wall of both inner compartment 18 and outer compartment 20. An internal plate section or divider 24 also comprises an elongated plate section bent at a 90° angle, being attached usually by welding along its edges to internal surfaces of base section 22. It is thus seen that inner compartment 18 is formed by a portion of base section 22 and internal plate 24 within header 12. End sections 19 and 21 close off the lateral ends of inner compartment 18 and outer compartment 20. External plate 26 is comprised of an elongated plate section which in the embodiment shown in FIGS. 1 and 3 is comprised of a rolled metal section having edges joined, usually by welding, along internal surfaces of base section 22 at points outward from the points of juncture between internal plate 24 and base section 22.

An inlet manifold 14 usually comprising a pipe-like metal section, is operatively connected to outer compartment 20 by welding inlet manifold 14 about an opening in external plate 26. Outlet manifold 16 is also usually comprised of a metal pipe that itself is operatively connected to inner compartment 18. Such operative connection is formed by extending outlet manifold 16 through an opening in external plate 26 but without operative contact with outer compartment 20. Outlet manifold 16 is operatively connected to inner compartment 18 by welding or other connection means about an opening in internal plate 24. Outlet manifold 16 is further sealed from leakage by welding or other means about an opening in external plate 26.

Tubular passageway 28 is operatively connected at one end to outer compartment 20 and at its other end to inner compartment 18. Tubular passageway 30 is operatively connected to its one end to inner compartment 18 and at its other end to outer compartment 20. Tubular passageways 28 and 30 usually comprise cylindrical metal tubes, usually made of steel which is galvanized after fabrication, but can be comprised of stainless steel or other suitable materials such as plastic. However, other shaped passageways would be operative in the cooling apparatus of the present invention. Such passageways could conceivably comprise other cross-section metal tubes such as hexagonal tubes. The ends of tubular passageways 28 and 30 are operatively connected to the inner and outer compartments usually by welding over openings in base section 22. It is thus seen that a refrigerant fluid would inlet through inlet manifold 14 and extend into outer compartment 20. Such refrigerant fluid would thus flow outwardly through the horizontally positioned upper portion of tubular passageway 28 and downwardly through the vertically position portion of tubular passageway 30. Such refrigerant liquid would pass through the entire lengths of tubular passageways 28 and 30 and enter inner compartment 18. Upon entering inner compartment 18, such refrigerant liquid would pass outwardly through outlet manifold 16. This process can be reversed for the same effect, whereby 16 becomes an inlet manifold and 14 an outlet manifold, for the same heat transfer effect.

Figure 2:
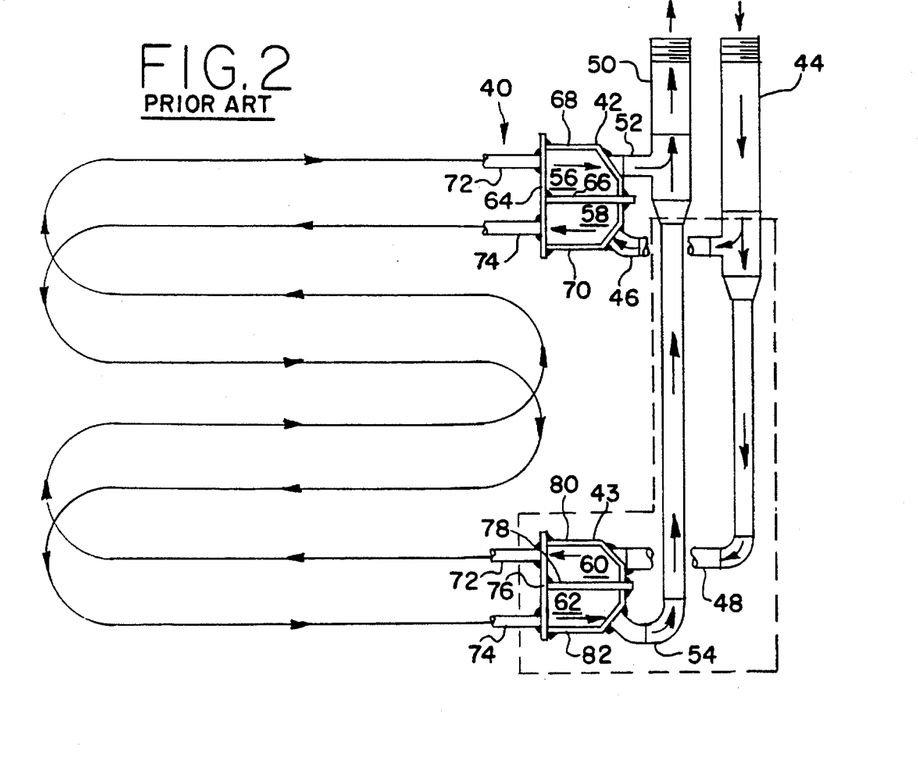
FIG. 2 is a side view in partial cross-section of a cooling apparatus of a prior art cooling apparatus.

Referring now to FIG. 2 of the drawings, a prior art cooling apparatus is shown generally at 40. It should be understood that cooling apparatus 40 is designed to be immersed in a pool of liquid stored in a vessel, similar to cooling apparatus 10 described above. Cooling apparatus 40 generally is comprised of an upper header 42 and a lower header 43. Upper header 42 is usually comprised of galvanized steel or stainless steel, plastic, or non-ferrous metal such as copper, and extends in a lateral fashion across a top corner of cooling apparatus 40. Similarly, lower header 43 extends laterally across a lower corner of cooling apparatus 40. Also, within the vessel of liquid would be inlet manifold 44 with upper inlet section 46 and extending downward to lower inlet 48. Outlet manifold 50 similarly is located largely within the liquid in the vessel and includes upper outlet 52 and lower outlet 54. Inlet manifold 44 and outlet manifold 50 are typically comprised of galvanized or stainless steel piping or other suitable fluid conducting materials such as a plastic or copper.

Referring in particular to upper header 42, this header is seen to comprise an outlet compartment 56 and an inlet compartment 58. These two compartments are formed by base section 64 which, in this embodiment, is seen to comprise a generally flat, lateral by extending plate usually comprised of metal such as galvanized or stainless steel. Laterally extending base section 64 receives and abuts one edge of a generally flat, laterally extending internal plate or divider 66 which is welded or similarly joined to a portion of base section 64 to form a generally T-shaped structure. An upper external plate 68 is shown to be a laterally extending metal structure formed to join at one edge to base section 64 and at its other edge to internal plate 66 at a point vertically removed from the juncture of internal plate 66 and base section 64. The provision of upper external plate 68 when combined with the portion of base section 66 and internal plate 66 are seen comprise upper header outlet compartment 56. Similarly, upper header lower external plate 70 is seen to be a laterally extended formed metal plate joined along one edge to base section 64 and along another edge to internal plate 66. Again, such joining is typically by welding or other suitable means. The provision of lower external plate 70, in combination with a section of base section 64 and internal plate 66 are seen to form upper header inlet compartment 58.

Upper inlet 46 is seen to extend from inlet manifold 44 and be operatively connected to inlet compartment 58 through an opening in upper header lower external plate 70. The joining of upper inlet 46 to upper header lower external plate 70 is by means such as welding. Similarly, their outlet section 52 from outlet manifold 50 is operatively connected to upper header outlet compartment 56. Upper outlet 52 is joined over an opening in upper external plate 68 by means such as welding.

Tubular passageway 72 is seen to extend from a section 64 and be operatively connected to upper header outlet compartment 56. It is understood that tubular passageway 72 is usually comprised of a cylindrical tubular structure usually of stainless steel or other suitable material. However, it is to be understood that tubular passageway 72 could take on other cross-sectional shapes such as a hexagonal structure. Similarly, tubular passageway 74 is seen to be operatively connected to upper header inlet compartment 58 by welding or other suitable means over an opening in base section 64. Similar comments regarding tubular passageway 72 and its various possible shapes and component material also apply to tubular passageway 74.

Referring now to lower header 43, it is seen to generally comprise an inlet compartment 60 and an outlet compartment 62. Lower inlet 48 extending from inlet manifold 44 is operatively connected to inlet compartment 60. Lower outlet 54 extending from outlet manifold 50 is operatively connected to lower header outlet compartment 62.

Lower header 43 itself is seen to be constructed in a manner quite similar to upper header 42. This structure, to be brief, includes lower header base section 76, usually comprised of a laterally extending plate section usually comprised of galvanized or stainless steel or similar metal. An internal plate or divider 78 is seen to be a laterally extending plate structure joined at one edge thereof to a portion of base section 76 so as to form a T-shaped structure. Such joining is usually by welding. Upper external plate 80 is seen to be a bent or formed metal piece joined at one edge to base section 76 and its other edge to internal plate 78. Such lower header inlet compartment 60 is thus seen to be formed by a portion of base section 76, internal plate 78 and upper external plate 80. Lower inlet 48 is seen to be joined over an opening in upper external plate 80 so as to be operatively connected to inlet compartment 60. Lower compartment 62 is seen to be formed in a similar manner by lower external plate 82 being a bent or formed metal piece joined along one edge to a portion of base section 76 and along its other edge to internal plate 78. Such joining is usually by welding or other suitable means. Lower outlet 54 is operatively connected to lower header outlet compartment 62 by welding or other suitable means over an opening in lower external plate 82.

It is also seen that tubular passageway 72 is operatively connected to inlet compartment 60 by welding or other suitable means over an opening in base section 76. Similarly, tubular passageway 74 is operatively connected to outlet compartment 62 by welding or other suitable means over an opening in base section 76.

Accordingly, it is seen that in this prior art cooling apparatus, a refrigerant liquid would enter upper inlet compartment 58 and flow downwardly into lower inlet 48 and thus also into lower header inlet compartment 60. Such refrigerant liquid would flow through both tubular passageways 72 and 74 and then exit through upper header outlet compartment 56 and lower header outlet compartment 62. In exiting lower header outlet compartment 62, it is seen that the refrigerant liquid would flow through lower outlet 54 and upwardly through outlet manifold 50.

The space in the vessel containing the liquid in which cooling apparatus 40 would be immersed is seen to be not as efficiency used as in cooling apparatus 10. The reason for this is that inlet manifold 44 and outlet manifold 50 both have sections extending downwardly through and into lower inlet 48 and lower outlet 54. In the present invention cooling apparatus 10, such space is seen to be utilized by the vertical extent of tubular passageways 28 and 30. Such an arrangement provides a more efficient use of the refrigerant flowing through tubular passageways 28 and 30.

Figure 4:
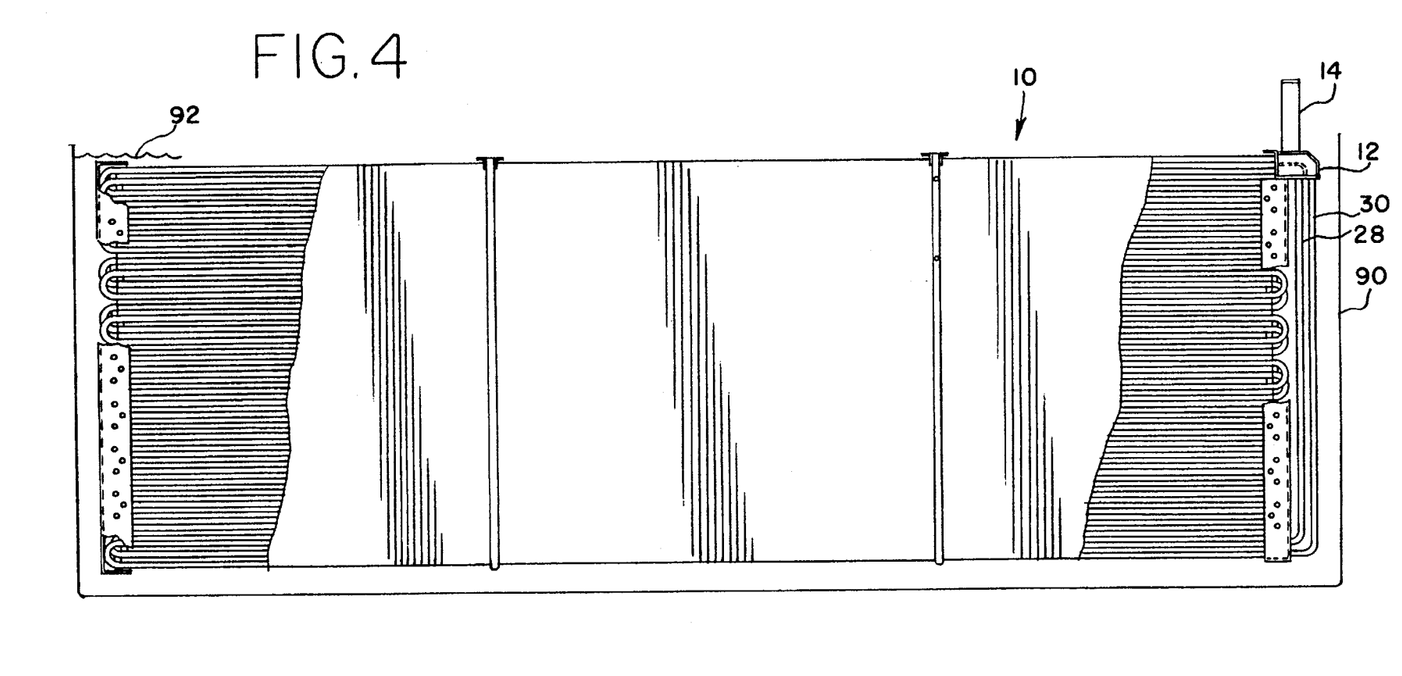
FIG. 4 is a side view of an entire cooling apparatus in accordance with the present invention including a vessel enclosing the tubular passageways.

Referring now to FIGS. 4–6 of the drawings, cooling apparatus 10 of the present invention is shown installed in liquid containing vessel 90. Liquid 92 is held in vessel 90 and most typically extends above the top of cooling apparatus 10. The vertical extent of tubular passageways 28 and 30 can be seen to contribute to the overall cooling capacity of cooling apparatus 10 as such vertical extent of tubular passageways 28 and 30 is usually completely immersed in liquid 90. Whether cooling apparatus is used as a ice storage arrangement wherein ice would be formed on tubular passageways 28 and 30 or whether cooling apparatus 10 would be used as fluid cooler wherein liquid to be cooled would be passed through tubular passageways 28 and 30, additional capacity is readily seen to be achieved by the vertical extent of tubular passageways of 28 and 30, as opposed to the prior art arrangement wherein two singular manifolds take up the space at one end of the cooling apparatus.

An additional advantage of cooling apparatus 10 over prior art cooling apparatus 40 is the elimination of the additional time, effort and cost associated with the assembly of the lower manifold which is eliminated in cooling apparatus 10 of the present invention. When the additional cooling capacity of cooling apparatus 10's combined with the lower cost due to the elimination of assembly requirements associated with the lower manifold, the overall cost per stored cooling unit (usually measured in ton-hours) capability of cooling from the cooling apparatus 10 of the present invention is lower than that of prior art cooling apparatus 40. One ton-hour is one ton of cooling provided over a one-hour period.

Figure 7:
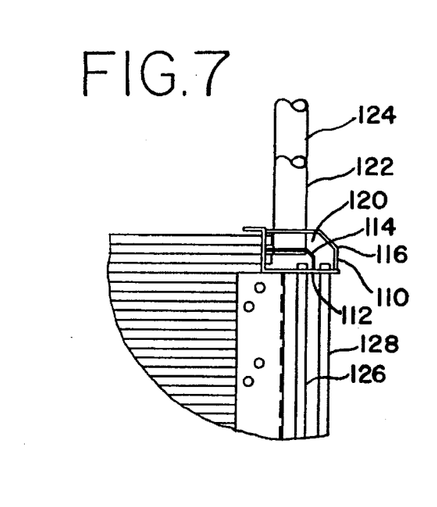
FIG. 7 is a partial cross-sectional detail view of an embodiment of a manifold and header arrangement in accordance with the present invention.

Referring now to FIGS. 7–11 of the drawings, alternate embodiments of the improved header of the present invention are shown. In FIG. 7, header 110 is shown with an inner compartment 118 and an outer compartment 120. The materials of construction are similar to those described above with reference to FIG. 1. Details of such materials will not be set forth here. Base section 112 is shown as comprising a laterally extending metal plate bent at a 90° angle. Internal divider 114 is shown as a laterally extending metal plate formed such that one edge butts against one side of base section 112 and another edge butts against another side of base section 112, thereby, forming inner compartment 118. The joints between internal divider 114 and base section 112 are typically welds. External plate 116 is also shown as a laterally extending metal plate formed so as to allow one edge to butt against one leg of base section 112 so as to form outer compartment 120. Outlet manifold is operatively connected to inner compartment 118, and inlet manifold 124 is operatively connected to outer compartment 120 in a manner similar to that described above. Similarly, tubular passageway 126 is operatively connected to inner compartment 118 and tubular passageway 128 is operatively connected to outer compartment 120 in a manner similar described to that above for FIG. 1.

Figure 8:
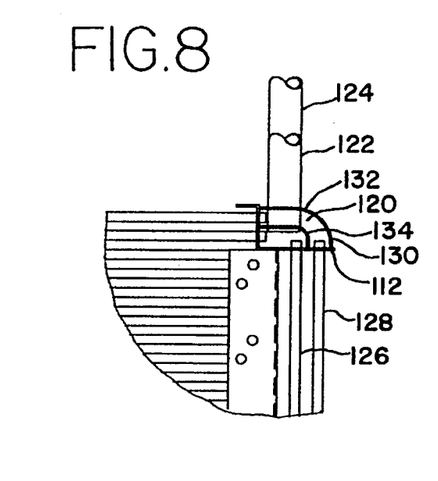
FIG. 8 is a partial cross-sectional detail view of another embodiment of a manifold and header arrangement of the present invention.

Referring now to FIG. 8, a header arrangement similar to that shown in FIG. 7 is set forth. The only differences are that internal divider 134 is a laterally extending plate with a rolled configuration, but still having its ends joined to base section 112 which is identical to that shown in FIG. 7. Further, external plate 132 is also a laterally extending plate, usually of metal, having a rolled configuration with its ends also joined to base section 112. In a manner similar to that explained above for FIG. 7, internal divider 134 and external plate 132 for inner compartment 118 between base section 112 and internal divider 134. The other connections of inlet and outlet manifolds and tubular passageways are similar to those described for FIG. 7.

Figure 9:
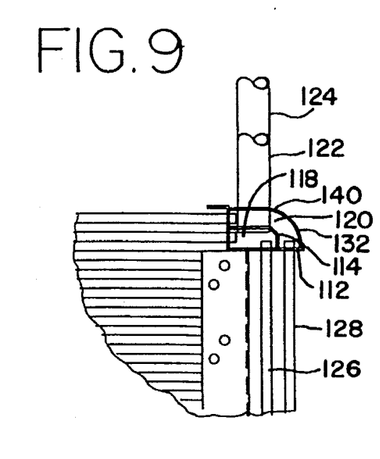
FIG. 9 is a partial cross-sectional detail view of another embodiment of a manifold and header arrangement of the present invention.

Referring now to FIG. 9, header 140 is similar to the header shown in FIGS. 7 and 8. Header 140 is seen to comprise external plate 132 that is a rolled metal plate identical to that shown in FIG. 8 with similar connections to base plate 112. Internal divider 114 is similar to that shown in FIG. 7, with internal divider 114 comprising a laterally extending plate having a bent or formed shape. Internal compartments 118 and 120 are similar to those shown in FIGS. 7 and 8, as are the connections of inlet and outlet manifolds and tubular passageways.

Figure 10:
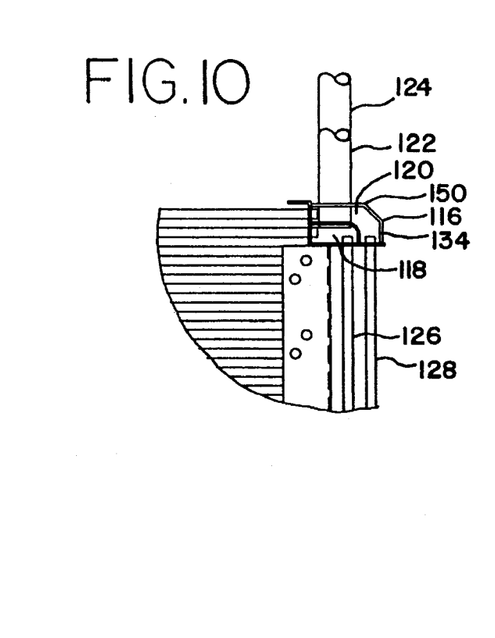
FIG. 10 is a partial cross-sectional detail view of another embodiment of a manifold and header arrangement of the present invention.

Referring now to FIG. 10, header 150 is shown. Header 150 is similar to the header shown in FIGS. 7–9. However, this header utilizes an inner divider 134 similar to that shown and described in FIG. 8. External plate 116 is similar to that shown and described in FIG. 7. The other connections of manifolds and tubular passageways is similar to that described in FIGS. 7–9.

Figure 11:
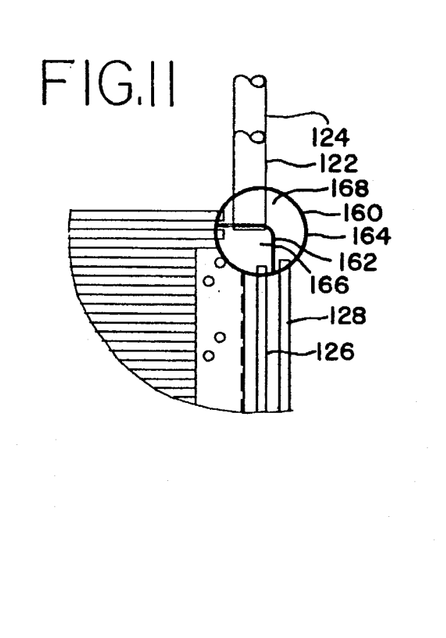
FIG. 11 is a partial cross-sectional detail view of another embodiment of a manifold and header arrangement of the present invention.

Referring now to FIG. 11, header 160 is shown as another embodiment of the present invention. This header comprises an elongated cylindrical external enclosure 164. Inner divider 162 is shown as a 90° elongated formed metal structure having one edge joined along an internal surface of external enclosure 164 and the other end joined along another surface of external enclosure 164. Accordingly, inner compartment 166 is formed between a portion of external enclosure 164 and inner divider 162, and compartment 168 is formed between the other side of inner divider 162 and external enclosure 164. The connections of manifolds 122 and 124 and tubular passageways 126 and 128 are similar to those described in FIGS. 7–10.

Figure 12:
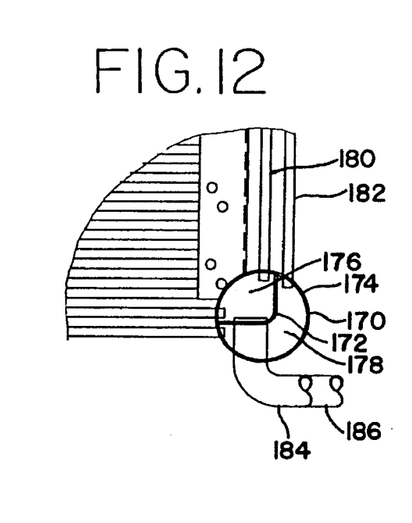
FIG. 12 is a partial cross-sectional detail view of another embodiment of a manifold and header arrangement of the present invention.

Referring now to FIG. 12, header 170 is shown as another embodiment of the present invention. It is seen that header 170 is located at a lower corner of the cooling assembly. The structure of this embodiment is very similar to that shown in FIG. 11, with inner divider 172 within external enclosure 174 forming inner compartment 176 and outer compartment 178 in a manner similar to that described in FIG. 11. Tubular passageways 180 and 182 are operatively connected to inner and outer compartments 176 and 178, respectively. Outlet and inlet manifolds 184 and 186 are also operatively connected to inner and outer compartments 176 and 178, respectively, in a manner similar to that described in more detail in FIG. 11.

Figure 13:
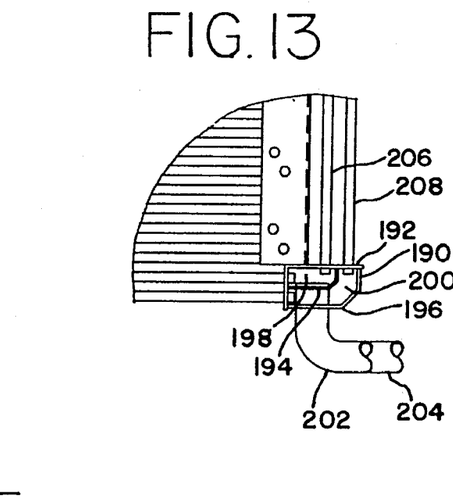
FIG. 13 is a partial cross-sectional detail view of another embodiment of a manifold and header arrangement of the present invention.

Referring now to FIG. 13 of the drawings, an alternative embodiment of the present invention is shown as header 190. This header is located at a lower corner of the cooling apparatus as is the embodiment shown in FIG. 12. The embodiment of header 190 is very similar to that described above in FIG. 7 for header 110. Accordingly, this description will be brief. Base section 192 is shown as an elongated formed metal structure. Internal divider 194 is also a formed metal piece joined along at its edges to internal surfaces of base section 192 to form inner compartment 198. External plate 196 is also an elongated metal structure formed so as to be joined along its edges to portions of base section 192 outward from the joined surfaces with internal divider 194. Outer compartment 200 is formed between internal divider 194 and external plate 196. Outer manifold 202 is operatively connected to inner compartment 198, and inlet 204 is operatively connected to outer compartment 200 by welding such pipes over openings in internal divider 194 and external plate 196. Similarly, tubular passageways 206 are operatively connected to inner compartment 198 and tubular passageways 208 are operatively connected to outer compartment 200.

Figure 14:
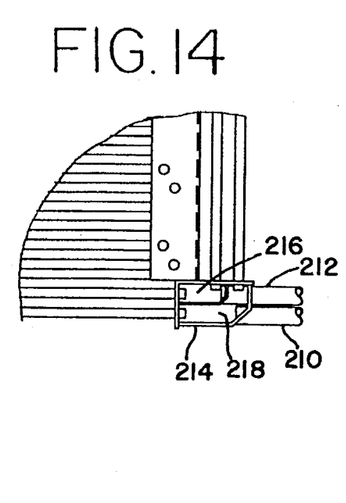
FIG. 14 is a partial cross-sectional detail view of another embodiment of a manifold and header arrangement of the present invention.

Referring now to FIG. 14, header 214 is shown as an alternative embodiment of the present invention. Header 214 is quite similar to header 190 described with FIG. 13 above, so the similar details will not be repeated here. It is seen that outlet manifold 212 is operatively connected in a horizontal fashion to inner compartment 216, and inlet manifold 210 is operatively connected to outer compartment 218.

Figure 15:
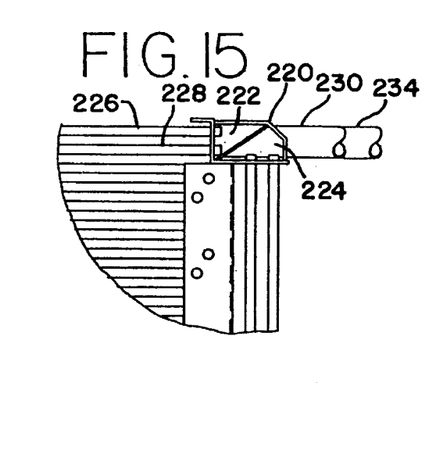
FIG. 15 is a partial cross-sectional detail view of another embodiment of a manifold and header arrangement of the present invention.

Referring now to FIG. 15, header 220 is shown as an alternative embodiment of the present invention. Header 220 is shown as located at an upper corner of the cooling apparatus. This embodiment envisions the use of the cooling apparatus as a fluid cooler. Accordingly, inner compartment 222 is operatively connected to tubular passageways 226 and 228 with such passageways in parallel. Outer compartment 224 is operatively connected to the other ends of tubular passageways 226 and 228. Inlet header is operatively connected to inner compartment 222, and outlet header 234 is operatively connected to outer compartment 224. It is seen that fluid to be cooled would enter through inlet header into inner compartment 222 and then pass through tubular passageways 226 and 228 in parallel. Such passageways go throughout the entire cooling apparatus and be cooled as explained above by contact with fluid within the cooling apparatus vessel. When passing through the vertical parts of tubular passageways of 226 and 228, the cooled fluid would enter outer compartment 224 and exit through outlet header 234.

Figure 16:
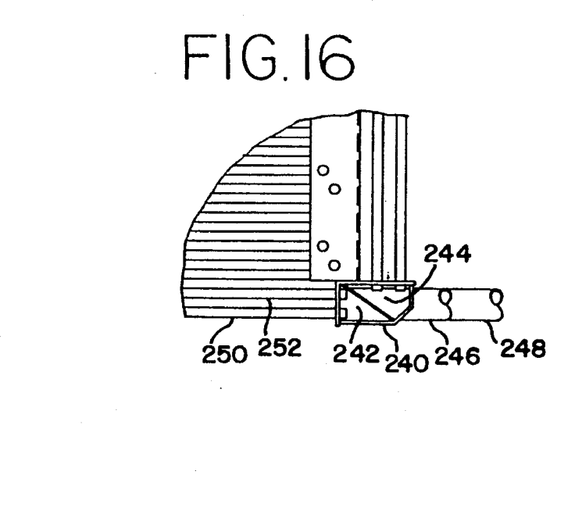
FIG. 16 is a partial cross-sectional detail view of another embodiment of a manifold and header arrangement of the present invention.

Referring now to FIG. 16, header 240 is shown as an alternative embodiment of the present invention. It is seen that header 240 is located at a lower corner of the cooling apparatus. This arrangement, similar to embodiment shown in FIG. 15, the cooling apparatus in the present invention is designed to operate as a fluid cooler. Accordingly, inner compartment 242 is operatively connected to tubular passageways 250 and 252 which would receive fluid to be cooled in parallel. Such fluid after cooling would exit through the vertical extending tubular passageways entering outlet compartment 244. Fluid to be cooled would enter through inlet header 246 and to inner compartment 242 and exit through outlet header 248 connected to outer compartment 244.

What is claimed is:

1. A method of operating a thermal storage apparatus wherein liquid is frozen and stored during a storage cycle, comprising the steps of passing cold refrigerant liquid through one or more tubular passageways immersed in a pool of storage liquid confined within a vessel thereby creating an envelope of frozen storage liquid around the tubular passageways, wherein said cold refrigerant is provided to said tubular passageways and withdrawn from said tubular passageways through a header assembly comprising an elongated structure having an inner chamber and an outer chamber, said inner chamber operatively connected to one end of each of said tubular passageways and to a first external flow nozzle, said outer chamber operatively connected to the other end of each of said tubular passageways and to a second external flow nozzle, such that said cold refrigerant enters through one of said external flow nozzles into one of said inner or outer chambers, and flows through each of said tubular passageways into the other of said inner or outer chambers and then through the other of said external flow nozzles, wherein said cold refrigerant enters said outer chamber through said second external flow nozzle, flows through each of said tubular passageways into said inner chamber and exits through said first external flow nozzle.

2. The method of claim 1 wherein said header assembly inner chamber comprises an internal wall section and an external wall section, and said external wall section also forms part of the outer chamber.

3. A thermal storage apparatus wherein liquid is frozen and stored during a storage cycle by passing cold refrigerant liquid through one or more tubular passageways immersed in a pool of storage liquid creating an envelope of frozen storage liquid around said tubular passageways, said storage apparatus comprising a vessel confining said pool of storage liquid and said tubular passageways, a header assembly for providing said cold refrigerant to said tubular passageways and withdrawing said cold refrigerant from said tubular passageways, said header assembly comprising an elongated structure having an inner chamber and an outer chamber, said inner chamber operatively connected to one end of each of said tubular passageways and to a first external flow nozzle, said outer chamber operatively connected to the other end of each of said tubular passageways and to a second external flow nozzle, such connections allowing said cold refrigerant to enter through one of said external flow nozzles into one of said inner or outer chambers and flow through each of said tubular passageways into the other of said inner or outer chambers and exit through the other of said external flow nozzles, wherein said header assembly inner chamber comprises an internal wall section and an external wall section with said external wall section also forming part of said outer chamber.

4. The thermal storage apparatus of claim 3 wherein said first external flow nozzle operatively connected to said inner chamber passes through said outer chamber.

5. The thermal storage apparatus of claim 3 wherein said header assembly comprises a base section comprising a first elongated plate, said first elongated plate having two leg sections oriented at an angle of less than 180°, an internal section comprising a second elongated plate, said second elongated plate joined along two opposite parallel edges to an internal surface of said first elongated plate to form said inner chamber, an external section comprising a third elongated plate, said third elongated plate joined along two opposite parallel edges to the internal surface of said first elongated plate outboard from said junction of said second elongated plate to form said outer chamber.

6. The thermal storage apparatus of claim 5 wherein said the two leg sections of said first elongated plate are oriented at an angle of about 90°.

7. The thermal storage apparatus of claim 5 wherein said second elongated plate has two leg sections oriented at an angle of about 90°.

8. The thermal storage apparatus of claim 5 wherein said second elongated plate is of a curved shape.

9. The thermal storage apparatus of claim 5 wherein said third elongated plate has two leg sections oriented to an angle of about 90°.

10. The thermal storage apparatus of claim 5 wherein said third elongated plate is of a curved shape.

11. The thermal storage apparatus of claim 3 wherein said header assembly comprises an tubular structure, a first elongated plate within said tubular structure and dividing said tubular structure into said inner chamber and said outer chamber.

12. A thermal storage apparatus wherein liquid is frozen and stored during a storage cycle by passing cold refrigerant liquid through one or more tubular passageways immersed in a pool of storage liquid creating an envelope of frozen storage liquid around said tubular passageways, said storage apparatus comprising a vessel confining said pool of storage liquid and said tubular passageways, a header assembly for providing said cold refrigerant to said tubular passageways and withdrawing said cold refrigerant from said tubular passageways, said header assembly comprising an elongated structure having an inner chamber and an outer chamber, said inner chamber operatively connected to one end of each of said tubular passageways and to a first external flow nozzle, said outer chamber operatively connected to the other end of each of said tubular passageways and to a second external flow nozzle, such connections allowing said cold refrigerant to enter through one of said external flow nozzles into one of said inner or outer chambers and flow through each of said tubular passageways into the other of said inner or outer chambers and exit through the other of said external flow nozzles, wherein said header assembly comprises an tubular structure, a first elongated plate within said tubular structure and dividing said tubular structure into said inner chamber and said outer chamber.

13. A cooling apparatus comprising a vessel confining a pool of liquid, a plurality of separate passageways generally immersed in said pool of liquid, a header assembly comprising an elongated structure having a first chamber and a second chamber, said first chamber operatively connected to one end of each of said separate passageways and said second chamber operatively connected to the other end of each of said separate passageways, a first external flow nozzle connected to said first chamber and a second external flow nozzle connected to said second chamber, wherein said vessel has a top and a bottom and said plurality of separate passageways comprise vertically extending sections that run from near the bottom of said vessel to said header assembly near the top of said vessel.

14. A method of operating a thermal storage apparatus wherein liquid is frozen and stored during a storage cycle, comprising the steps of passing cold refrigerant liquid through one or more tubular passageways immersed in a pool of storage liquid confined within a vessel thereby creating an envelope of frozen storage liquid around the tubular passageways, wherein said cold refrigerant is provided to said tubular passageways and withdrawn from said tubular passageways through a header assembly comprising an elongated structure having an inner chamber and an outer chamber, said inner chamber operatively connected to one end of each of said tubular passageways and to a first external flow nozzle, said outer chamber operatively connected to the other end of each of said tubular passageways and to a second external flow nozzle, such that said cold refrigerant enters through one of said external flow nozzles into one of said inner or outer chambers, and flows through each of said tubular passageways into the other of said inner or outer chambers and then through the other of said external flow nozzles, wherein said first external flow nozzle operatively connected to said inner chamber passes through said outer chamber.

15. The thermal storage apparatus of claim 12 wherein said first elongated plate has two opposite parallel edges, said edges joined to internal surfaces of said tubular structure to form said inner chamber and said outer chamber.

* * * * *